(12) United States Patent
Sutherland et al.

(10) Patent No.: US 11,926,035 B2
(45) Date of Patent: Mar. 12, 2024

(54) SECURITY ROBOT WITH LOW SCANNING CAPABILITIES

(71) Applicant: CrossWing Inc., Aurora (CA)

(72) Inventors: Stephen Sutherland, Aurora (CA); Philippe Guillaumont, Oakville (CA); Daniel Sutherland, Aurora (CA)

(73) Assignee: CrossWing Inc., Aurora (CA)

(*) Notice: Subject to any disclaimer, the term of this patent is extended or adjusted under 35 U.S.C. 154(b) by 856 days.

(21) Appl. No.: 16/874,427

(22) Filed: May 14, 2020

(65) Prior Publication Data
US 2020/0269433 A1 Aug. 27, 2020

Related U.S. Application Data

(63) Continuation of application No. PCT/CA2018/000223, filed on Nov. 14, 2018.

(30) Foreign Application Priority Data
Nov. 15, 2017 (CA) .................................. 2985566

(51) Int. Cl.
*B25J 11/00* (2006.01)
*B25J 5/00* (2006.01)
(Continued)

(52) U.S. Cl.
CPC ............. *B25J 11/002* (2013.01); *B25J 5/007* (2013.01); *G05D 1/0214* (2013.01); *G06F 16/583* (2019.01); *G05D 2201/0209* (2013.01)

(58) Field of Classification Search
CPC ...... B25J 11/002; B25J 5/007; B25J 11/0025; G05D 1/0214; G05D 2201/0209; G06F 16/583; H04N 7/185
See application file for complete search history.

(56) References Cited

U.S. PATENT DOCUMENTS 4,396,344 A * 8/1983 Sugimoto ................ B25J 9/104
414/706
9,535,421 B1 * 1/2017 Canoso ................ G05D 1/0248
(Continued)

FOREIGN PATENT DOCUMENTS

CN 202295049 U 7/2012
CN 205539531 U 8/2016
(Continued)

OTHER PUBLICATIONS

O'Malley, A.; International Search Report from corresponding PCT Application No. PCT/CA2018/000223; search completed Feb. 8, 2019.
(Continued)

*Primary Examiner* — Rachid Bendidi
(74) *Attorney, Agent, or Firm* — Laurie Wright; Christopher N. Hunter; Blake, Cassels & Graydon LLP

(57) ABSTRACT

A mobile robot with one or more deployable scanning wands that advantageously mounts each scanning wand for movement from a storage position in or adjacent to a wall of the mobile base unit to a deployed position extending outwardly from the robot adjacent ground level. Preferably, the robot includes two or more deployable scanning wands and a holonomic drive function is provided in the mobile base unit. This drive allows controlled linear and rotational movement of the robot to provide an effective scan area. Sensors can be provided in the sides of the mobile base for assistance in control of the drive and/or further scanning of a vehicle, trailer or object of interest.

10 Claims, 5 Drawing Sheets

(51) Int. Cl.
  *G05D 1/00*    (2006.01)
  *G05D 1/02*    (2020.01)
  *G06F 16/58*   (2019.01)
  *G06F 16/583*  (2019.01)

(56) References Cited

U.S. PATENT DOCUMENTS

| | | |
|---|---|---|
| 2008/0302200 A1 | 12/2008 | Tobey |
| 2015/0269792 A1* | 9/2015 | Wood .................... G07C 5/006 |
| | | 901/44 |
| 2016/0188977 A1 | 6/2016 | Kearns et al. |
| 2017/0225334 A1 | 8/2017 | Deyle et al. |

FOREIGN PATENT DOCUMENTS

| | | |
|---|---|---|
| WO | 2005/015163 A2 | 2/2005 |
| WO | 2006/071198 A2 | 7/2006 |
| WO | 2008/105948 A2 | 9/2008 |

OTHER PUBLICATIONS

Office Action dated May 10, 2022 issued in connection with corresponding Indian Application No. 202017025023.
Rogers, John R.; "Low-cost robotic arm control"; Proceedings of SPIE; Apr. 3, 2008; vol. 6962; DOI: 10.1117/12.784331; ISBN: 978-1-5106-1533-5.
Lumineau, S.; Extended European Search Report from corresponding European Application No. 18877922.7; search completed Jul. 20, 2021.

* cited by examiner

SECURITY ROBOT WITH LOW SCANNING CAPABILITIES

CROSS-REFERENCE TO RELATED APPLICATIONS

This application is a continuation of PCT Application No. PCT/CA2018/000223 filed on Nov. 14, 2018, which claims priority from Canadian Application No. 2,985,566 filed on Nov. 15, 2017 both incorporated herein by reference in their entirety.

FIELD OF THE INVENTION

The present invention relates to mobile robots and, in particular, to mobile robots that have enhanced low level scanning capabilities.

BACKGROUND OF THE INVENTION

For many security applications, vehicles are stopped at a checkpoint and are manually or automatically scanned to make an assessment with respect to security risks. For example, cars and trucks have been used to conceal bombs and then driven to a particular location and activated.

At known or temporary checkpoints, scans can be conducted automatically or personnel can conduct a manual scan using hand positioned scanners. Often, portions of the underside of the vehicle are scanned using a hand scanner having a relatively long reach for providing a video assessment of the lower contour of the floor of the vehicle. Such sensors can also include vapor testers for detecting the presence of an explosive. It is also known to drive a vehicle onto a scanning structure where the scanning structure conducts an automated or manually assisted scan of the vehicle. With handheld or hand positioned scanners, a consistent or repeatable scan is difficult and as such this approach has certain disadvantages.

For temporary checkpoints, manual type scans are used and the assessment of the scan relies heavily on the expertise of the personnel conducting the scan.

There remains a need to provide a consistent approach for scanning of vehicles and other structures.

SUMMARY OF THE INVENTION

A mobile security robot according to the present invention comprises a mobile with a plurality of driven wheels allowing controlled linear and rotational movement of said mobile security robot. The mobile base includes at least one deployable scanning wand movable from a storage position associated with said mobile base to a deployed position extending outwardly from a lower portion of an exterior wall of the mobile base. Each scanning wand is connected to a drive mechanism of the mobile security robot for movement of the scanning wand between the storage position and the deployed position. The deployable scanning wand and the exterior wall include scanning and sensor devices for conducting a vehicle scan.

In an aspect of the invention, each deployable scanning wand includes a cluster of sensors at a free end thereof.

In a further aspect of the invention, each deployable scanning wand is elongate with a pivot connection securing said deployable scanning wand to the exterior wall.

In a preferred aspect of the invention, the storage position of the scanning wand is an upright orientation of the scanning wand.

In a preferred aspect of the invention, the upright position of the scanning want is adjacent the exterior wall of the mobile base.

In a preferred aspect of the invention, a fixed drive lever extends from the scanning wand adjacent the pivot connection.

In a preferred aspect of the invention, the drive lever is secured to a linear actuator located interior to said exterior wall. Preferably the pivot connection is located in the fixed drive lever offset from an elongate axis of the scanning wand.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
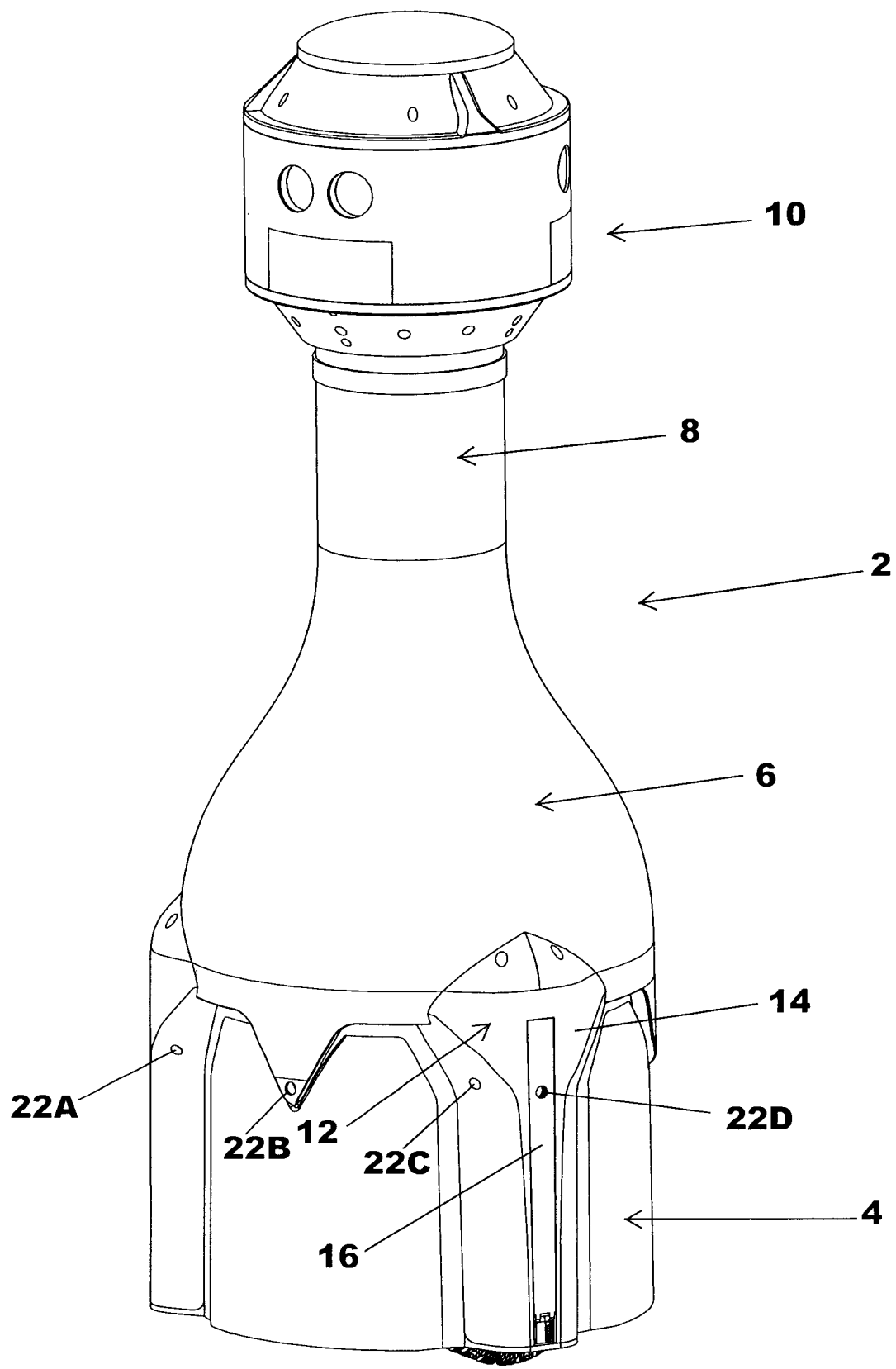
FIG. 1 is a perspective view of a security robot with lower scanner shown in the storage position.

The mobile robot 2 includes the base module 4, a transition module 6, a neck module 8 and the head module 10. The base module 4 includes three omni-wheels or three sets of omni-wheels provided around the perimeter thereof and each of the omni-wheels or sets thereof preferably includes a separate drive arrangement for powering thereof. One or more batteries are provided in the base module for powering the drive motors. Omni-wheels are the preferred drive arrangement however other wheeled arrangements that accommodate controlled linear and rotational movement of the robot about its vertical axis can also be used.

In the present design, the omni-wheels are protected within the base module and extend downwardly therefrom to engage the support surface. Depending upon the particular application, any of the transition module, the neck module and the head module may include different sensors for scanning of vehicles and recognizing the particular type of vehicle. By recognizing the particular type of vehicle, the mobile robot can also compare the actual individual scan with a database of scans that allow for comparison of the physical conditions of the actual scan with a known scan provided in the database for the particular vehicle.

One of the difficulties in effectively scanning of a vehicle, is scanning the underside of the vehicle due to restricted access and there are often a number of recesses and crevices present or created where it is possible to conceal materials.

The base module 4 includes three reinforced vertical channel covers 12 which provide additional support adjacent the drive wheels of the base module. The channel covers 12, as shown, each include a storage recess 14 which receives a deployable scanning wand 16. One such scanning wand 16 is provided for each reinforced vertical channel cover.

FIG. 1 shows the scanning wands in a generally vertical storage position with each wand received within the storage recess 14. This provides a protected storage position for the wand allowing the mobile robot to carry out other functions without possible damage to the scanning wands. Other storage positions of the scanning wands can be used.

The mobile robot 2 is symmetric with a repetition of a set of four time-of-flight distance measurement sensors 22A, 22B, 22C and 22D, provided in each of the 3 sections between channel covers 12. Each of these sets of sensors returns a rectangular grid of depth points. 22A and 22C face downwards and to the right and left, forming a crossing pattern between then. 22B and 22D face in a radial direction outwards and downwards with 22D facing through hole 31 in wand 16 when the wand is in the retracted position within its channel.

When the robot moves along the side of a vehicle, container, trailer or other item for inspection, wand 16 rotates downwards and the robot positions itself so that the sensor 22D above wand 16, is directly facing the item for inspection and the robot moves near the item. The robot's vision processing system then uses the neighboring 6 sensors as follows: if the robot is moving to the left, it will use the leftmost three sensors (i.e.: 22A, 22B, and 22C) to follow the contours of the vehicle or other item for inspection to move the robot closer or further from the item to avoid protruding tires, steps, fuel tanks and other obstructions hanging from the sides of the item while also tracking the ground surface with data from those sensors as well as sensors further around the robot in direction of travel. If the robot is moving to the right, it will use the rightmost adjacent three sensors to track protrusions from the item and obstructions in the ground plane. Since the robot is holonomic, it can move in any direction to best avoid obstructions while keeping the wand in as ideal location as possible for under item scanning coverage.

When retracted, sensor 30 of each wand faces nozzle hole 24 which is connected to a pressurized air supply. Such air supply provides small periodic bursts of air through nozzle hole 24 to blow dust from sensor 30 and escaping air also moves by side sensors 32A and 32B to assist in keeping their lenses clear.

Figure 4:
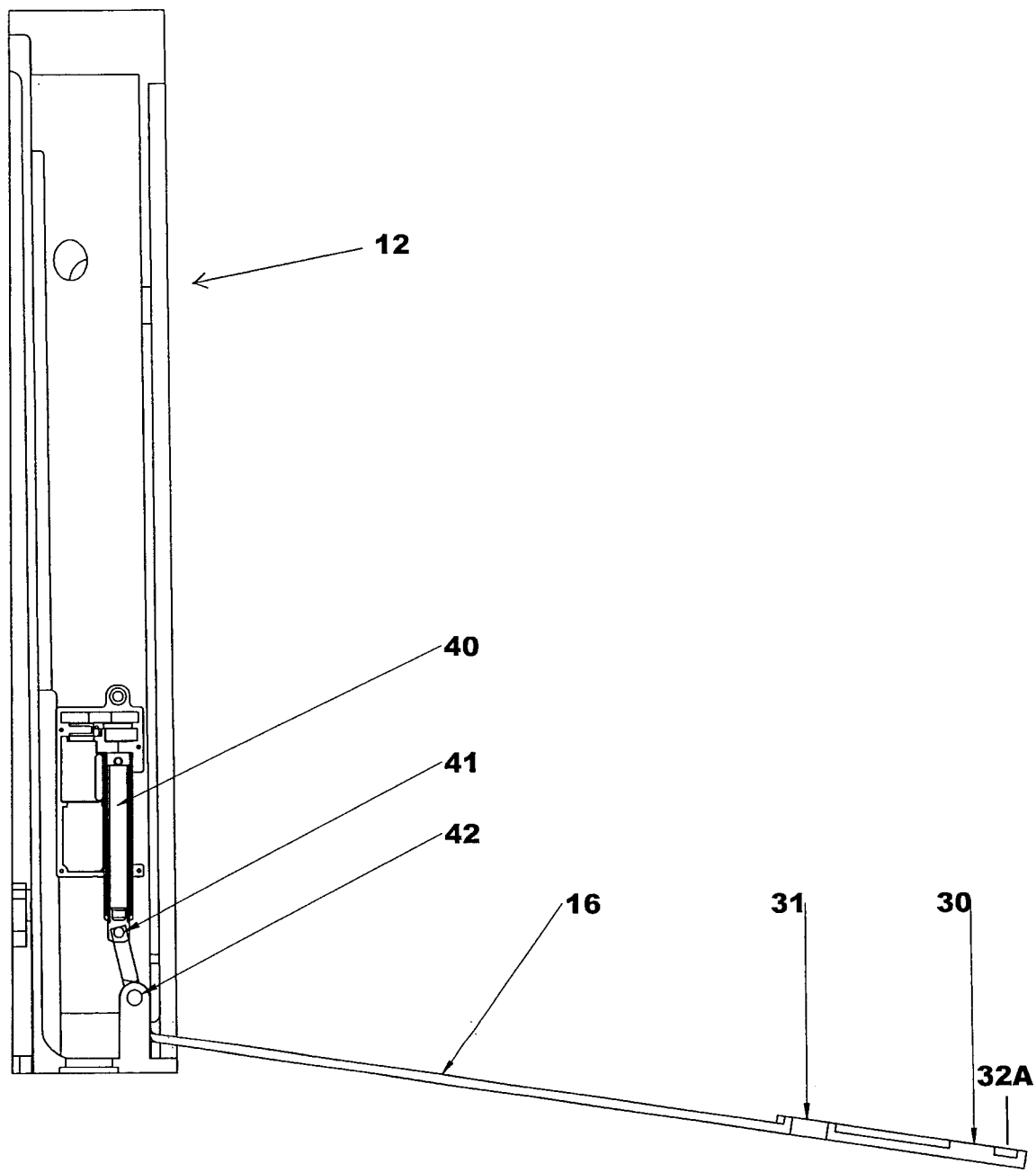
FIG. 4 is a sectional view through a portion of the robot showing a drive mechanism for raising and lowering of the scanner.

As illustrated in FIG. 4, small time-of-flight sensors (32A facing right and 32B facing left) optionally mounted perpendicular to sensor 30 are placed at the end of the wand facing to each side. During motion of the robot, 32A and 32B provide a grid array of depth data to assist the vision processor to identify obstructions which any of sensors 22A-22D are unable to detect from their vantage points.

Figure 2:
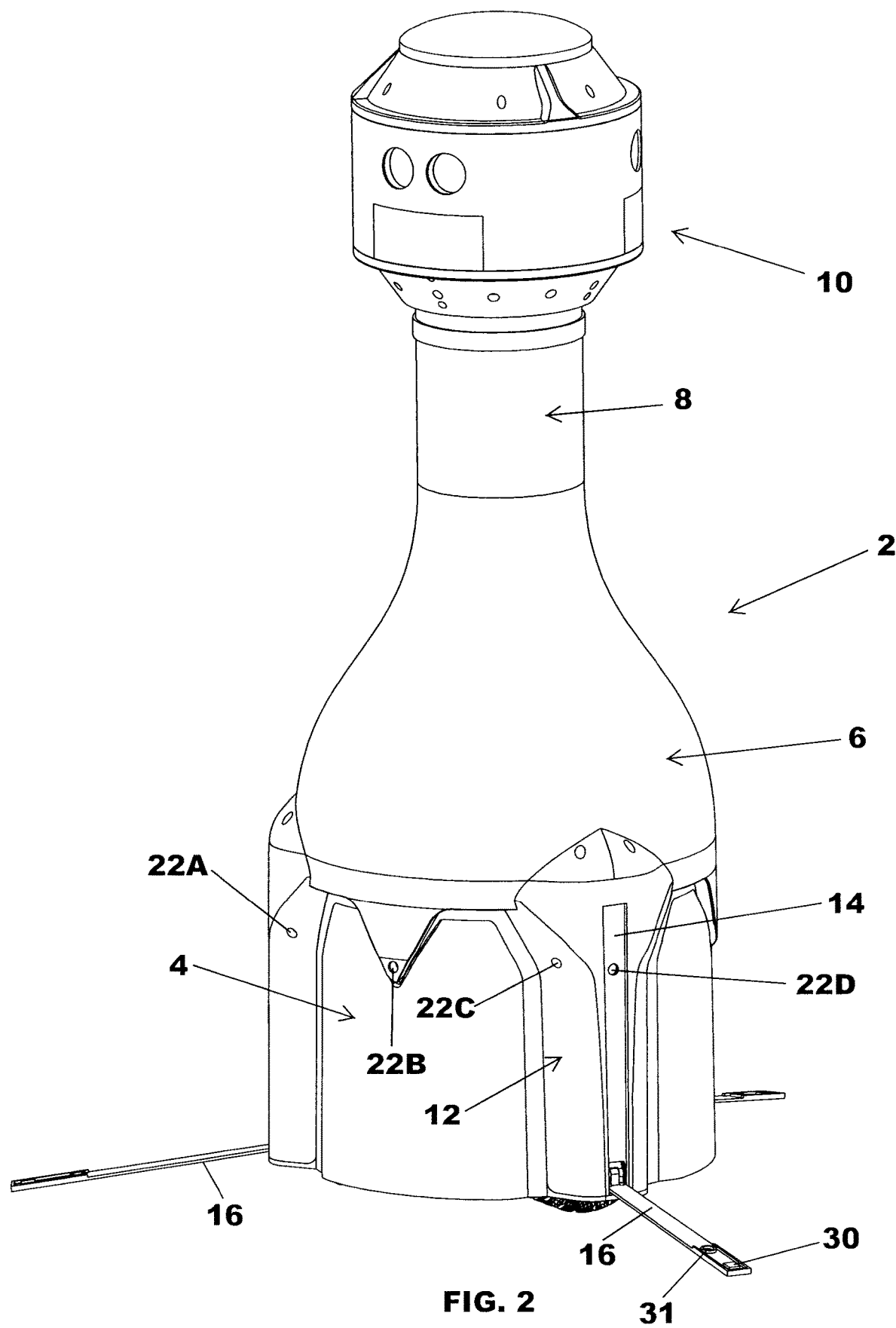
FIG. 2 is a perspective similar to FIG. 1 with three scanners shown in a lowered position.
Figure 3:
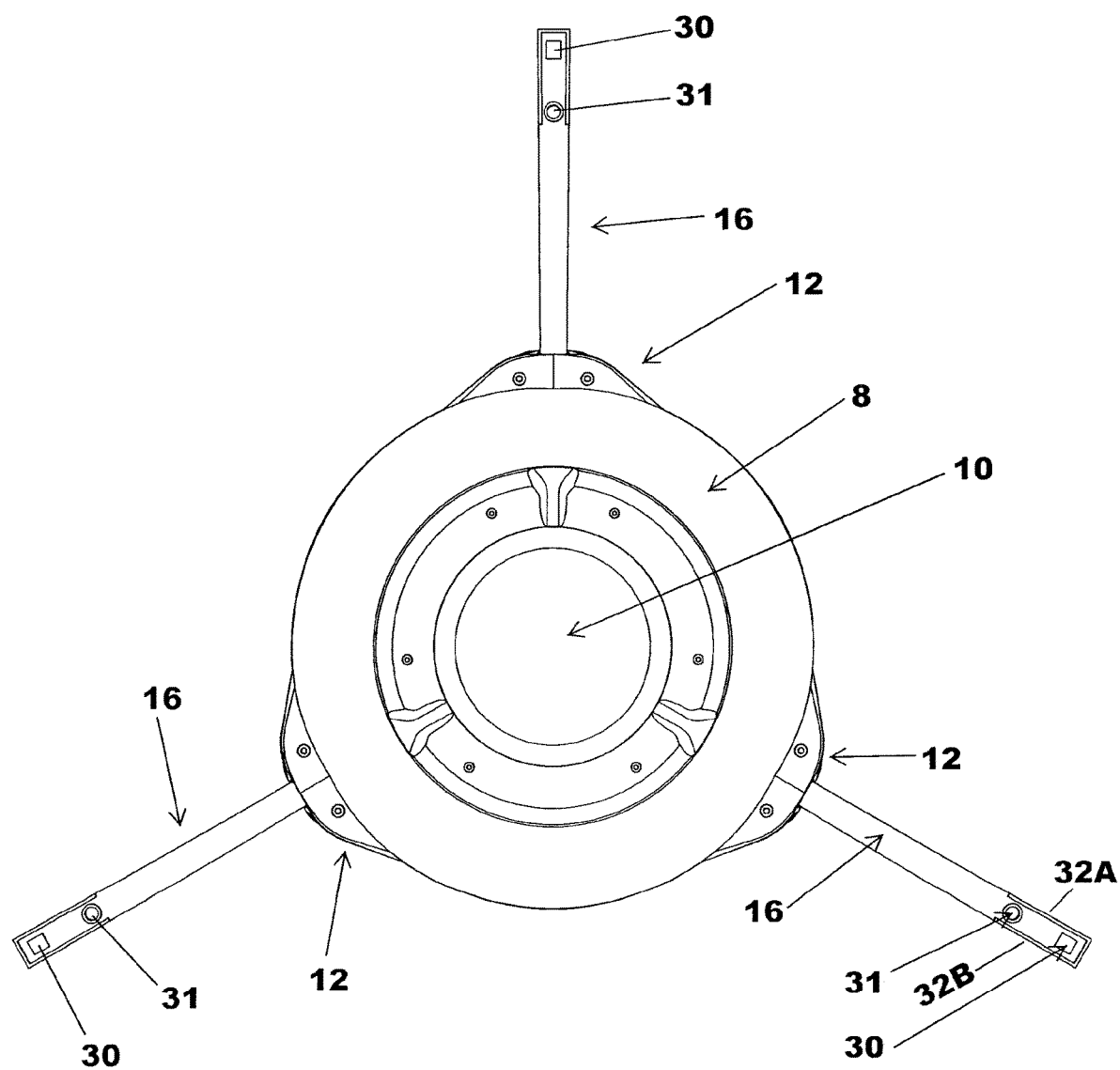
FIG. 3 is a top view of the security robot with the scanners in the lower position.

In FIG. 2, the scanning wands have been deployed and have been lowered to a scanning position with the head 18 of the scanning wand closely adjacent the support surface and positioned outwardly of the mobile robot. With the scanning wands deployed, as shown in FIGS. 2 and 3, sensor cluster 30 provided at the head of the scanning wand can be positioned under the vehicle to conduct a scan of the underside of the vehicle in a predetermined manner through port 31 allows sensor 220 to be unobstructed with the wand in a retracted position. The mobile robot can move along the outer periphery of the vehicle to allow good coverage of the scan of the lower surface. It is anticipated that the sensors will include a video camera for providing a visible assessment of the lower surface as well as other sensors for detecting the presence of explosives or other hazardous materials that are the particular subject of the scan. By providing three scanners generally associated with each of the drive wheels, it is possible to move the mobile robot along the periphery of the vehicle and use one or a plurality of these scanners for conducting the scan. It is also possible to use a spinning movement of the robot as it moves along the periphery to further change the scanning characteristics and/or use all of the sensors to cooperate and complete multiple scans.

It should be noted that the purpose of the scan is not limited to explosives. For example, the scan could be of assistance in locating illegal drugs, currency or other illegal substances being transported.

Sensor cluster 30 may be an RGB-D camera or camera arrangement producing RGB-D pixels at a high resolution such that the contours of the underside of an item to be scanned (vehicle, truck, container, cage, etc.) can be compared with similar model items stored in a database system OR the system can scan a new, unrecognized item and add it to the database, later comparing subsequent scans of the same model with previous scans drawing attention to differences for further investigation. Sensor cluster 30 can also include infrared camera technologies to sense unexpected areas of heat or coolness—for example, if a dual exhaust vehicle has heat in only one exhaust pipe indicating the possible blockage of the second pipe with smuggled items.

Figure 5:
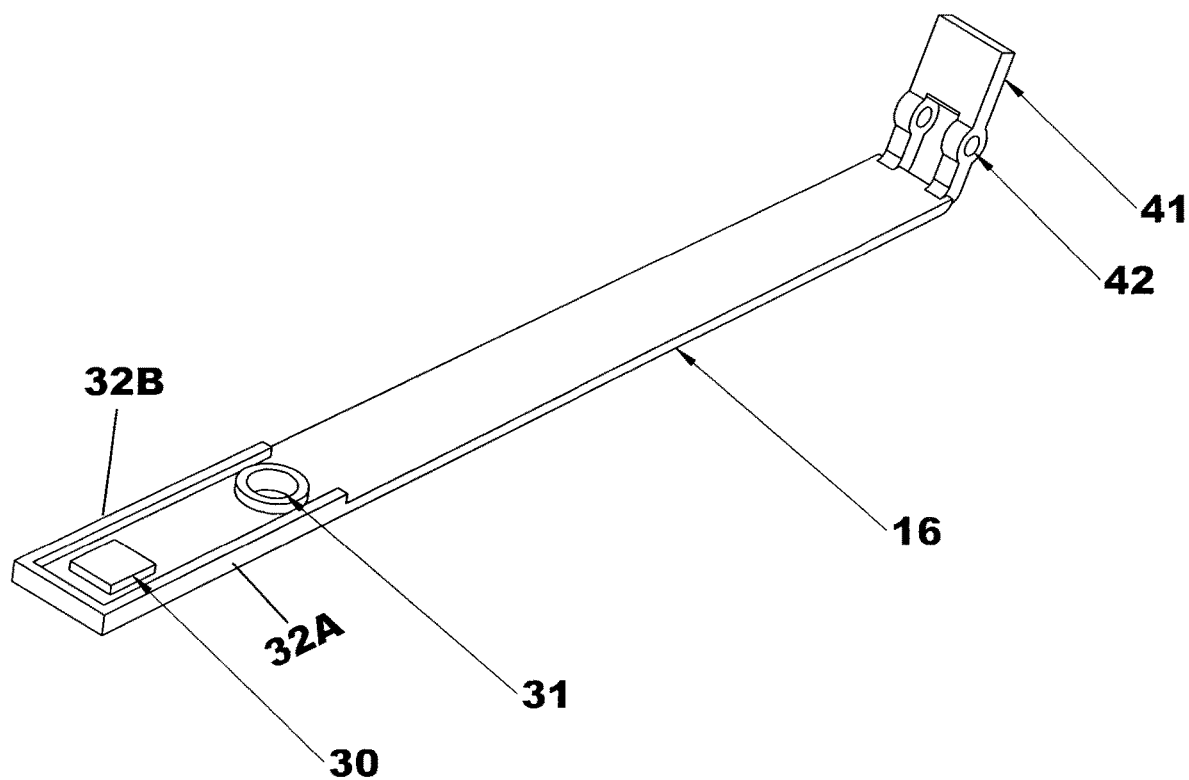
FIG. 5 is a perspective view of a scanning wand used in the mobile robot.

The deployable scanning wands 16 are shown in greater detail in FIGS. 4 and 5. These scanning wands shown are of a fixed length and include a pivot connection 42 at one end thereof and a drive lever 41. The drive lever 41 is used to move the deployable scanning wand about the pivot connection 42 when it is secured within the channel covers 12 as shown in FIG. 4.

The pivot connection 42 is within the cover and provides partial protection of this mechanism and the pivot connection from the environment. Movement of the electrically driven actuator 40 moves the deployable scanning wand to the lower scanning position or a particular scanning position. The actuator can also be used to move the scanning wand to the storage position as shown in FIG. 1. If during a scanning operation, a particular area proves to be of interest, the scanning wand can be moved upwardly to provide a more detailed scan of the area of interest.

The reinforced vertical channel covers 12 have been provided adjacent each of the omni-wheels to provide additional areas of high strength adjacent the axles of the omni-wheels. This reinforcing has been provided while also providing for the deployable scanning wands and the securement of the scanning wands in a high strength area of the mobile robot.

The scan provided by the mobile robot may be part of an initial scan of the vehicle to locate possible areas of concern or areas that warrant additional investigation. The scan completed by the mobile robot can be designed as a standalone scan or to supplement a manual scan and provides additional information or identification of areas requiring further investigation.

The particular scanning arrangement shown, uses a fixed length deployable scanning wand, however, a telescopic scanning wand can be used. Preferably, the telescopic scanning want, in a collapsed state, would be of a length for storage in the channel covers and be extendable to increase the reach of the scanning wand for more detailed scans depending upon the particular vehicle or structure to be scanned.

The mobile robot 2 has been shown with three deployable scanning wands, however, in some applications, only a single scanning wand may be necessary. The use of multiple scanning wands also allows the option of providing the mobile robot with different types of scanners on different deployable scanning wands and selectively using the deployable scanning wands for providing more information with respect to identifying materials of particular interest.

One of the advantages of the mobile robot is that the omni-wheel design can be used for spinning or rotating the robot about its own vertical axis. Also, the omni-wheel drive allows for movement of the robot as it is spinning or movement of the robot along the periphery without spinning. In this way, control of the robot allows for different types of scans or for allowing increased scanning of areas of concern. If an area of concern is identified, the robot could stop to alert personnel to review and conduct further scanning as may be required.

Different mechanisms for deploying of the scanning wands can be provided, however, the present arrangement that uses an electrically driven linear actuator for pivoting of the scanning wand and moving of the scanning wand from a storage to a deployed position, is cost effective and reliable. It is also space efficient and easily provided in the reinforced vertical channel covers that are secured to the base module. As can be appreciated, the mobile robot 2 can include specialized scanning software that utilizes and analyzes the scanned result from the various sensors of the deployable scanning wands.

Although preferred embodiments of the present invention have been described herein in detail, it will be appreciated by those skilled in the art that variations may be made thereto without departing from the scope of the appended claims.

The embodiments of the invention in which an exclusive property or privilege is claimed are defined as follows:

1. A mobile security robot comprising a mobile with a plurality of driven wheels allowing controlled linear and rotational movement of said mobile security robot;
    said mobile base including at least one deployable scanning wand having a longitudinal direction and movable from an upright storage position associated with said mobile base wherein the longitudinal direction of the deployable scanning wand is aligned with an upright direction of said mobile base, to a deployed position wherein the longitudinal direction of the wand is extending outwardly from a lower portion of an exterior wall of said mobile base; each scanning wand being connected to a drive mechanism of said mobile security robot for movement of the scanning wand between said upright storage position and said deployed position; and wherein said deployable scanning wand and said exterior wall including scanning and sensor devices for conducting a vehicle scan.

2. The mobile security robot as claimed in claim 1 wherein said upright storage position is provided in an exterior wall of said mobile base.

3. The mobile security robot as claimed in claim 1 wherein each deployable scanning wand includes a cluster of sensors at a free end thereof.

4. The mobile security robot as claimed in claim 3 wherein each deployable scanning wand is elongate with a pivot connection securing said deployable scanning wand to said exterior wall adjacent a lower edge thereof.

5. The mobile security robot as claimed in claim 4 including a fixed drive lever extending from said wand adjacent said pivot connection.

6. The mobile security robot as claimed in claim 5 wherein said fixed drive lever is secured to a linear actuator located interior to said exterior wall.

7. The mobile security robot as claimed in claim 5 wherein said pivot connection is located in said fixed drive lever.

8. The mobile security robot as claimed in claim 1 wherein said at least one deployable scanning wand is at least three deployable scanning wands.

9. The mobile security robot as claimed in claim 1 wherein said driver wheels are driven omni-wheels.

10. The mobile security robot as claimed in claim 1 wherein said mobile security robot includes a database to compare scanned images for deviation indicative of a security problem.

\* \* \* \* \*